United States Patent [19]

Stegmaier

[11] Patent Number: 4,756,331

[45] Date of Patent: Jul. 12, 1988

[54] ELECTROMAGNETIC VALVE

[75] Inventor: Alwin Stegmaier, Schwieberdingen, Fed. Rep. of Germany

[73] Assignee: Robert Bosch GmbH, Stuttgart, Fed. Rep. of Germany

[21] Appl. No.: 75,117

[22] Filed: Jul. 20, 1987

Related U.S. Application Data

[63] Continuation-in-part of Ser. No. 865,546, May 20, 1986, abandoned.

[30] Foreign Application Priority Data

May 25, 1985 [DE] Fed. Rep. of Germany ....... 3518978
May 9, 1986 [JP] Japan .................................. 61-105080
May 14, 1986 [EP] European Pat. Off. ........... 86106536

[51] Int. Cl.[4] ............................................ F16K 31/06
[52] U.S. Cl. ................................. 137/271; 137/625.65; 137/625.27; 251/129.14; 251/129.15
[58] Field of Search .............. 137/271, 625.65, 625.27; 251/129.14, 129.15

[56] References Cited

U.S. PATENT DOCUMENTS

| | | | |
|---|---|---|---|
| 780,754 | 1/1905 | Junggren | 137/625.27 X |
| 3,346,004 | 10/1967 | Costello | 137/271 |
| 3,661,183 | 5/1972 | Komaroff et al. | 137/625.65 |
| 4,063,568 | 12/1977 | Sosulnikov et al. | 137/271 X |
| 4,596,273 | 6/1986 | Klyoshima | 137/625.65 |
| 4,711,269 | 12/1987 | Sule | 137/625.65 |

FOREIGN PATENT DOCUMENTS

| | | | |
|---|---|---|---|
| 842238 | 7/1960 | United Kingdom | 137/625.65 |
| 2059019 | 4/1981 | United Kingdom | 137/625.27 |

Primary Examiner—Arnold Rosenthal
Attorney, Agent, or Firm—Michael J. Striker

[57] ABSTRACT

An electromagnetic valve has an armature, a plunger connected with the armature, a spring-biased valve body on which the plunger acts, a non-magnetic flange sleeve which guides the armature, a coil, a magnetic pole disc located opposite to the flange sleeve relative to the armature and attracting the armature with the plunger, the non-magnetic flange sleeve and the magnetic pole disc being interchangeable, and a spring which acts upon the armature, and is supported against the pole disc. The armature, the pole disc and the flange sleeve are formed so that by changing their position the electromagnetic valve can be converted from a currentless open electromagnetic valve to a currentless closed electromagnetic valve, and vice versa in that the pole disc can be located closer to the valve body and the flange sleeve can be located farther from the valve body so that the electromagnetic valve is converted to a currentless open electromagnetic valve, the flange sleeve can be located closer to the valve body and the pole disc can be located farther from the valve body so that the electromagnetic valve is converted into a currentless closed electromagnetic valve.

4 Claims, 3 Drawing Sheets

ELECTROMAGNETIC VALVE

This is a continuation-in-part of Ser. No. 865,546 filed of May 20, 1986 now abandoned.

BACKGROUND OF THE INVENTION

The present invention relates to an electromagnetic valve. More particularly, it relates to an electromagnetic valve which has a plunger mounted on an armature and acting upon a spring-loaded valve body, a flange sleeve which guides the armature, and a pole disc which is located opposite to the flange sleeve relative to a coil.

Electromagnetic valves of the above mentioned general type are known in the art. Such valves have a construction which is simple, inexpensive and light. They are especially suitable where mounting or weight problems must be solved. However, such electromagnetic valves possess the disadvantage in that they require different parts for "currentless open" or "currentless closed" positions. Thereby their support is expensive and the number of the individual parts must be respectively reduced.

SUMMARY OF THE INVENTION

Accordingly, it is an object of the present invention to provide an electromagnetic valve which avoids the disadvantages of the prior art.

More particularly, it is an object of the present invention to provide an electromagnetic valve which is simple and has the same parts and at the same has another arrangement to be used a currentless open or closed electromagnetic valve.

In keeping with these objects and with others which will become apparent hereinafter, one feature of the present invention resides, briefly stated, in an electromagnetic valve of the above mentioned general type in which by different arrangement of an armature, a pole disc and a flange sleeve selectively a currentless open or a currentless closed electromagnetic valve is provided.

More particularly, an electromagnetic valve in accordance with the invention has an armature, a plunger connected with the armature, a spring-biased valve body on which they plunger acts, a non-magnetic flange sleeve which guides the armature, a coil, a magnetic pole disc located opposite to the flange sleeve relative to the armature and attracting the armature with said plunger wherein the non- magnetic flange sleeve and the magnetic pole disc are interchangeable and the armature, the pole disc and the flange sleeve are formed so that by changing their position the electromagnetic valve can be converted from a currentless open electromagnetic valve to a currentless closed electromagnetic valve, and vice versa in that the pole disc can be located closer to the valve body and the flange sleeve can be located farther from the valve body so that the electromagnetic valve is converted to a currentless open electromagnetic valve, the flange sleeve can be located closer to the valve body and the pole disc can be located farther from the valve body so that the electromagnetic valve is converted into a currentless closed electromagnetic valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 1A:
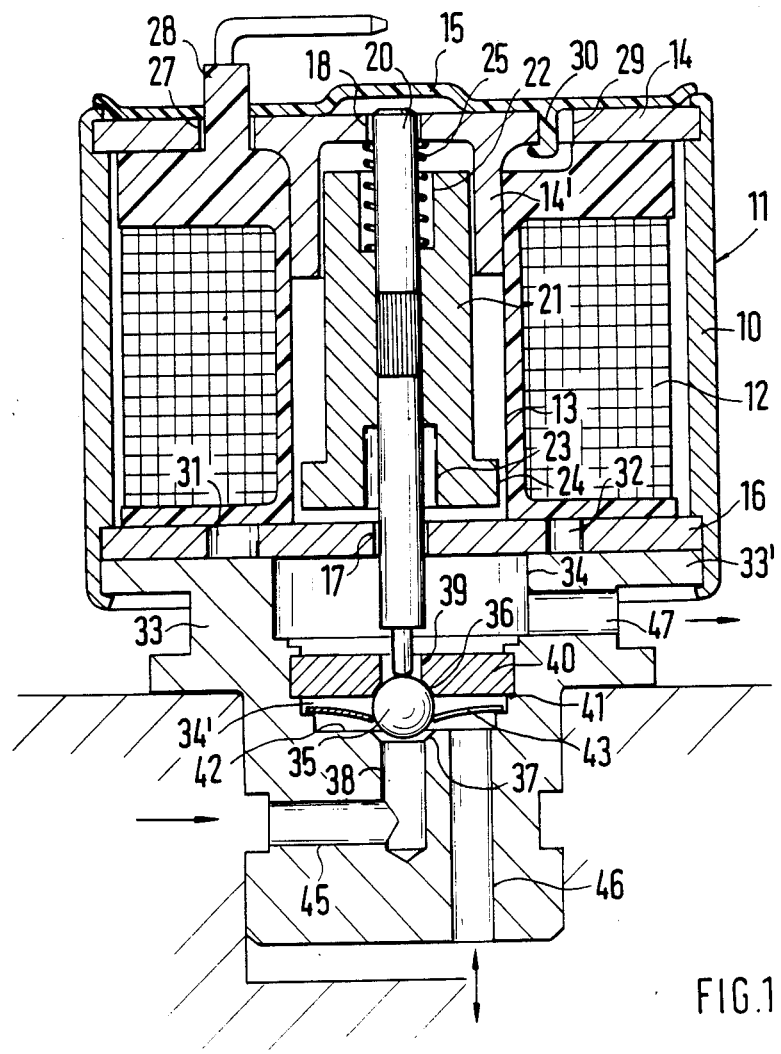
FIG. 1 is a view showing a longitudinal section of an electromagnetic valve formed as a "currentless open" valve in accordance with the present invention.
FIGS. 1A and 2A show diagrammatic symbols of the electromagnetic valves of FIGS. 1 and 2, respectively.

An electromagnetic valve as shown in FIG. 1 has a housing 10 of an electromagnet 11. The electromagnet has a coil 12 which has a central passage 13. Above the coil, a flange sleeve 14 is arranged. Its central sleeve shaped part 14' extends into the passage 13. The upper part of the housing 10 together with the flange sleeve 14 is closed by an insulating cover 15.

A pole disc 16 is located in the lower part of the electromagnet 11. The pole disc 16 has a central passage 17. The flange sleeve 14 has also a central passage 18 which is in alignment with the central passage 17. A plunger 20 extends through both passages 17 and 18 and is mounted in a cylindrically shaped armature 21. The armature has at its both end sides cylindrical recesses 22 and 23. Moreover, at its side which faces toward the pole disc 16 the armature has an outwardly extending small flange 24. A pressure spring 25 is arranged in the cylindrical recess 22 and abuts with its upper part against the flange sleeve 14. The spring serves as a coupling spring.

The flange sleeve 14 has, in addition to the central passage 14 also an offset passage 27 through which a connecting piece 28 of the coil 12 extends. Moreover, the flange sleeve 14 has another passage 29 which is also offset from the passage 28 and is located at the opposite side of the passage 27. A holding claw of 39 of the insulating cover 15 engages into the passage 29. Two passages 31 and 32 are provided in the pole disc 16 and formed so that they correspond to the above mentioned recesses and are in alignment with the latter.

A valve housing 33 abuts against the pole disc 16 with an edge 33' which also abuts against the housing 10 and is fixedly connected with one another by flanging the housing 10 around the edge. The valve housing 33 has a central inner chamber 34 into which the plunger 20 extends. The lower end of the plunger contacts a spherically shaped valve body 35 which is associated with two valve seats 36 and 37. The valve seat 37 is formed on an upper edge of an opening 38 formed in the valve housing 33. The opening 38 extends coaxially with the plunger 20 and is connected with the inner chamber 34. The valve seat 36 is located at the lower edge of a central opening 39 of a disc 40 which is located near a lower surface 42 of the inner chamber 34.

A disc-shaped spring 43 is located in a chamber 34' which is formed between the disc 40 and the lower surface 42 of the inner chamber 34. The spring 43 acts upon the valve body 35 in direction toward the plunger 20. An opening 45 extends from the opening 38 outwardly of the housing and communicates with a not shown pump conduit. An opening 46 extends parallel to the opening 38 in a lower part of the valve housing 33 and opens into the chamber 34'. This opening is also connected with a not shown conduit which leads to a consumer. Finally, an opening 47 extends into the inner chamber 34 above the disc 40 and forms a communication to a container. The spring 43 is slotted and allows passage of the pressure medium.

The operation of this valve which is formed as 3/2-directional valve is simple. When the magnet is not energized, the spring 43 which is formed so that is force is greater than the force of the spring 25 plus the weight of the armature 21 and the plunger 20, presses the valve body 35 upwardly. The pressure medium flows from the pump via the openings 45 and 38 into the chamber 35' and from it via the opening 46 to a consumer. When the magnet is energized, the armature 21 is pulled toward the pole disc 16 and the plunger 20 presses the valve body 35 against the valve seat 37. Thereby a communication from the opening 46 via the opening 39 to the opening 47 takes place and therefore a return flow of the pressure medium. It is believed to be clear that the valve is currentless open. Its diagram is shown in FIG. 1A. The spring 25 can be dispensed with.

Figure 2A:
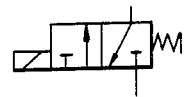
Figure 2:
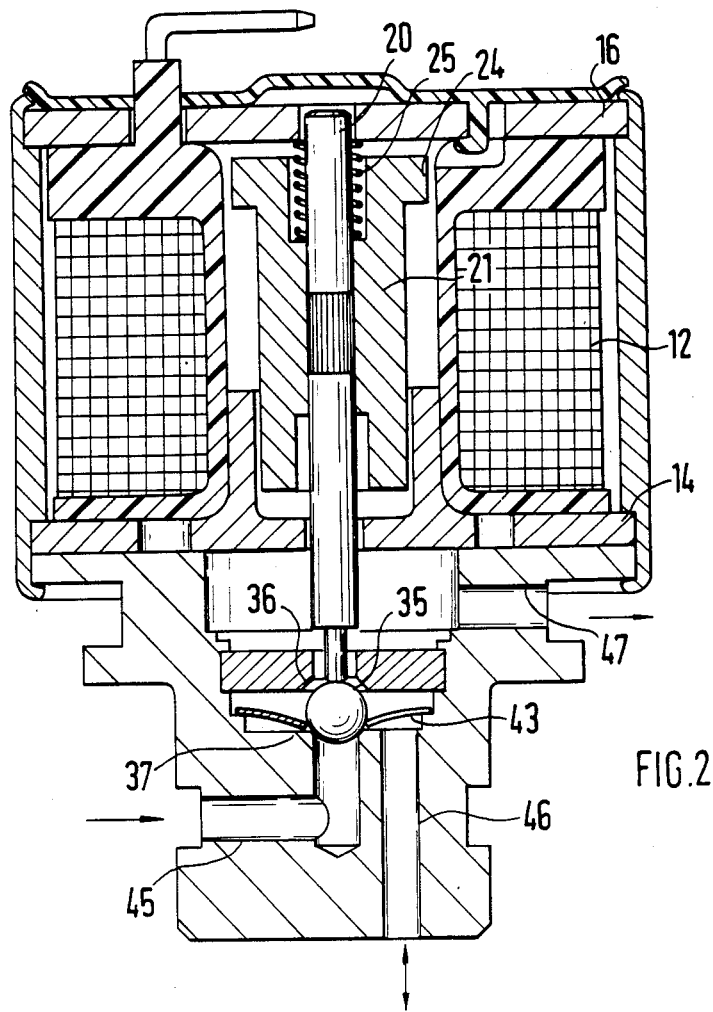
FIG. 2 is a view showing a longitudinal section of an electromagnetic valve formed as a "currentless closed" valve in accordance with the present invention.

The electromagnetic valve shown in FIG. 2 is also a 3/2-magnetic valve. However, it is currentless closed. The diagram of this valve is shown in FIG. 2A. This electromagnetic valve utilizes the same essential parts as the electromagnetic valve of FIG. 1. More particularly, the electromagnetic valves of both embodiments use the flange sleeve 14, pole disc 16 and armature 21. The difference is that the pole disc 16 and the flange sleeve 14 replace one another at the respective locations. The armature 21 is turned so that its flange 24 faces toward the pole disc 16. The conversion of the valve is very simple since, as described hereinabove, the passages 27, 29, 31, 32 are immediately available. When the coil 12 is energized, the armature 21 together with the plunger 20 is pulled toward the pole disc 16. The plunger releases the valve body 35, so that the spring 43 presses the valve body against the valve seat 36. The pressure medium can flow now from the opening 45 through the valve seat 37 to the opening 46 and thereby to the consumer. When the coil 12 is currentless, the force of the spring 25 and the weight of the armature 21 and plunger 20 which are selected so that combined they are greater than the force of the spring 43, press the valve body 35 against the valve seat 37. Thereby, the connection from the pump to the consumer is blocked. However, the connection is established from the opening 46 to the opening 47 or in other words from the consumer to the container.

Figure 3:
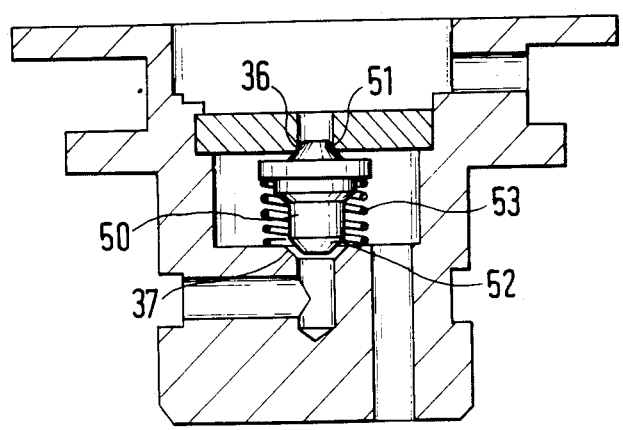
FIG. 3 is a view showing an individual part of the electromagnetic valve in accordance with another embodiment of the present invention.

The embodiment shown in FIG. 3 differs from the above described embodiments only in that the valve body is formed somewhat differently. It is identified with reference numeral 50 and has two conical surfaces 51 and 52 which cooperate with valve seats 36 and 37 respectively. The spring is formed here as a pressure spring 53. The operation of the valve is the same as described hereinabove.

It will be understood that each of the elements described above, or two or more together, may also find a useful application in other types of constructions differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnetic valve, comprising an armature; a plunger connected with the armature; a spring-biased valve body on which said plunger acts; a non-magnetic flange sleeve which guides said armature; a coil; a magnetic pole disc located opposite to said flange sleeve relative to said armature and attracting said armature with said plunger, said non-magnetic flange sleeve and said magnetic pole disc being interchangeable; and a coupling spring which acts upon said armature, said armature, said pole disc and said flange sleeve are formed so that by changing their position the electromagnetic valve can be converted from a currentless open electromagnetic valve to a currentless closed electromagnetic valve, and vice versa in that said pole disc can be located closer to said valve body and said flange sleeve can be located farther from the valve body so that the electromagnetic valve is converted to a currentless open electromagnetic valve, said flange sleeve can be located closer to said valve body and said pole disc can be located farther from the valve body so that said electromagnetic valve is converted into a currentless closed electromagnetic valve.

2. An electromagnetic valve as defined in claim 1; and further comprising a valve housing which accommodates said valve body; and an electromagnet housing which accommodates said flange sleeve and said pole disc and is connected with said valve housing.

3. An electromagnetic valve as defined in claim 1, wherein when the electromagnetic valve is converted to a currentless open electromagnetic valve, said coupling spring acts upon said armature and is supported against said flange sleeve.

4. An electromagnetic valve as defined in claim 1, wherein said electromagnetic valve is converted into a currentless closed eletrcomagnetic valve, said coupling spring acts upon said armature and is supported against said pole disc.

* * * * *